US 7,204,356 B2
Apr. 17, 2007

(12) United States Patent
Fox

(10) Patent No.: US 7,204,356 B2
(45) Date of Patent: Apr. 17, 2007

(54) FRICTION CLUTCH ASSEMBLY

(75) Inventor: James Fox, Sullivan, MO (US)

(73) Assignee: Ace Manufacturing & Parts Company, Sullivan, MO (US)

( * ) Notice: Subject to any disclaimer, the term of this patent is extended or adjusted under 35 U.S.C. 154(b) by 0 days.

(21) Appl. No.: 11/287,597

(22) Filed: Nov. 28, 2005

(65) Prior Publication Data
US 2006/0076207 A1 Apr. 13, 2006

Related U.S. Application Data

(62) Division of application No. 10/727,687, filed on Dec. 4, 2003, now abandoned.

(51) Int. Cl.
F16D 13/56 (2006.01)
F16D 13/70 (2006.01)
(52) U.S. Cl. .................. 192/70.13; 192/70.19
(58) Field of Classification Search ............ 192/70.13, 192/70.19, 70.2, 115
See application file for complete search history.

(56) References Cited

U.S. PATENT DOCUMENTS

| 916,086 | A | | 6/1909 | Woods | |
|---|---|---|---|---|---|
| 1,554,394 | A | * | 9/1925 | White | 192/70.19 |
| 2,277,273 | A | | 3/1942 | Spase | |
| 2,682,943 | A | | 7/1954 | Root | |
| 3,361,239 | A | | 1/1968 | Binoler | |
| 3,557,923 | A | * | 1/1971 | Nickell | 192/70.14 |
| 4,225,025 | A | * | 9/1980 | Crawford | 192/70.2 |
| 4,298,112 | A | | 11/1981 | Carstensen | |
| 4,425,991 | A | | 1/1984 | Hays | |
| 4,629,048 | A | | 12/1986 | Draper et al. | |
| 4,770,282 | A | | 9/1988 | Maycock et al. | |
| 4,793,456 | A | | 12/1988 | Kummer et al. | |
| 4,815,189 | A | | 3/1989 | Ijames et al. | |
| 4,890,708 | A | | 1/1990 | Kitano et al. | |
| 5,033,599 | A | | 7/1991 | Hays | |
| 5,205,388 | A | | 4/1993 | Hashimoto et al. | |
| 5,375,688 | A | | 12/1994 | Hays | |
| 5,377,803 | A | | 1/1995 | Link et al. | |
| 5,499,704 | A | | 3/1996 | Hays | |
| 5,593,015 | A | | 1/1997 | Kosumi et al. | |
| 5,638,932 | A | | 6/1997 | Mizukami | |
| 5,785,163 | A | | 7/1998 | Bell | |
| 6,394,254 | B1 | | 5/2002 | Ijames | |
| 2003/0201144 | A1 | | 10/2003 | Szedkowski et al. | |

FOREIGN PATENT DOCUMENTS

| GB | 2125495 A | | 3/1984 |
|---|---|---|---|
| WO | WO 9404838 A1 | * | 3/1994 |

* cited by examiner

Primary Examiner—Richard M. Lorence
(74) Attorney, Agent, or Firm—Senniger Powers

(57) ABSTRACT

A friction clutch assembly comprises a cover mounted on a flywheel of a driving shaft. A pressure plate has a contact surface for receiving a driving force from the driving shaft that is axially moveable between an engaged position and a disengaged position. A spring supported by the cover urges the pressure plate into the engaged position. Compression of the spring releases pressure on the pressure plate to permit movement of the pressure plate to the disengaged position. At least one spacer attached to the cover and flywheel has an external surface that engages the pressure plate upon rotation of the flywheel. The external surface of the spacer conforms to the contact surface of the pressure plate so that torque is transmitted between the flywheel and the pressure plate over at least a line of engagement of the spacer external surface and the pressure plate contact surface upon rotation of the flywheel. The cover may have a continuous curved surface with a varying radius of curvature over a length of the curve to resist deflection and prevent premature failure of the cover.

23 Claims, 17 Drawing Sheets

FRICTION CLUTCH ASSEMBLY

CROSS-REFERENCE TO RELATED APPLICATION

This application is a divisional of U.S. patent application Ser. No. 10/727,687, filed Dec. 4, 2003, now abandoned, the entire disclosure of which is incorporated herein by reference.

BACKGROUND OF THE INVENTION

The present invention relates generally to friction clutches, and in particular to a clutch assembly used in high performance vehicles such as racing cars.

As is well known, vehicle clutches operate to selectively couple and decouple an engine to a drive shaft for the purpose of starting the engine while the vehicle is in gear, bringing the vehicle to a stop while the engine is running, changing gears while the vehicle is in motion and putting the vehicle in motion from a dead stop. Conventional clutches include a cover assembly having an annular cover plate and at least one annular pressure plate connected to the cover plate for conjoint rotation with the cover plate. The cover plate is fixedly attached to a flywheel driven by the vehicle engine, so that the pressure plate is located between the cover plate and the flywheel. Typically, attachment of the cover plate to the flywheel is by a plurality of threaded fasteners received in spacers between the flywheel and the cover plate. The spacers engage the peripheral edge of the pressure plate causing the conjoint rotation of the flywheel, cover plate and pressure plate.

A driven shaft is received through the cover assembly and flywheel free of fixed connection to any of these so that absent action of the clutch, the driven shaft and flywheel rotate independently of each other. The driven shaft is splined and one or more friction discs are mounted on the splines for conjoint rotation with the driven shaft, while being free to slide longitudinally of the driven shaft. The friction discs are positioned between the pressure plate and the flywheel. Floater plates are disposed between adjacent friction discs and also rotate with the spacers.

Springs between the cover plate and the pressure plate force the plate away from the cover plate and clamp the friction discs against the flywheel. This clamping action mates the drive shaft and flywheel for conjoint rotation so that the drive shaft is driven by the engine. The clutch is released to permit independent rotation of the flywheel and drive shaft by a clutch pedal in the vehicle connected to the pressure plate by a mechanical linkage.

The spacers that engage the periphery of the pressure plate typically comprise a round sleeve that contacts each pressure plate at a single contact point. When the spacers wear, grooves will form on the external surface of the spacer as a result of the high concentration of forces transmitted through the single contact point of each spacer. During operation of the vehicle, the axial movement of the pressure plates is inhibited by the grooves formed on the spacers causing the clutch to stick. Therefore, a need exists to extend the wear life of the spacers and improve operation of existing clutch designs.

As the vehicle operates, the cover plate endures bending forces that cause deflection of the cover plate. The cover plate deflection results in fatigue and eventual failure of the cover plate. Typically, the cover plate is strengthened by making it of steel and sizing it large enough to resist the bending forces. Increased size and weight of the cover plate undesirably increases its inertia. In high performance racing, a stock car may operate at 8,000 to 9,000 rpm for several hours to complete a race. The inertia of the cover plate becomes a hindrance to racing performance because of the energy from the engine taken up to maintain rotation of the cover plate detracts from the speed of the car. Therefore, it is desirable to construct a cover plate that is lightweight but has sufficient strength to withstand the bending forces present under racing conditions.

SUMMARY OF THE INVENTION

Among the several objects and features of this invention may be noted the provision of a friction clutch assembly that reduces deflection of the cover; the provision of such a friction clutch assembly which has a long life; the provision of such a friction clutch assembly that is lightweight thus providing lower inertia; and the provision of such a friction clutch assembly that provides improved reliability and reduced clutch maintenance.

Generally, a friction clutch assembly of the present invention connects driving and driven shafts. The friction clutch assembly comprises a cover adapted for mounting on a flywheel of the driving shaft in a fixed axial position relative to the flywheel and for conjoint rotation with the flywheel. A pressure plate is supported by the cover for rotation therewith. The pressure plate has a contact surface for receiving a driving force from the driving shaft. The pressure plate is axially moveable between an engaged position wherein the pressure plate applies a force to clamp a friction disk of said driven shaft in operative engagement with the flywheel thereby to transmit torque from the driving shaft to the driven shaft and a disengaged position wherein the pressure plate does not clamp said friction disk and substantially no torque is transmitted to the driven shaft. A spring is supported by the cover to urge the pressure plate into the engaged position. Compression of the spring releases pressure on the pressure plate to permit movement of the pressure plate to the disengaged position. At least one spacer is fixedly attached to the cover and the flywheel for conjoint rotation therewith. The spacer is slidably received by the pressure plate to connect the pressure plate to the cover and permit axial movement of the pressure plate between the engaged position and the disengaged position. The spacer has an external surface that engages the pressure plate upon rotation of the flywheel. The spacer is rotatably moveable with the cover and the flywheel, and the external surface of the spacer conforms to the contact surface of the pressure plate so that torque is transmitted between the flywheel and the pressure plate over at least a line of engagement of the spacer external surface and the pressure plate contact surface upon rotation of the flywheel.

In another aspect of the invention a friction clutch assembly for connecting driving and driven shafts comprises a cover adapted for mounting on a flywheel of the driving shaft in a fixed axial position relative to the flywheel and for conjoint rotation with the flywheel. A pressure plate is supported by the cover for rotation therewith. The pressure plate is axially moveable between an engaged position wherein the pressure plate applies a force to clamp a friction disk of said driven shaft in operative engagement with the flywheel thereby to transmit torque from the driving shaft to the driven shaft and a disengaged position wherein the pressure plate does not clamp said friction disk and substantially no torque is transmitted to the driven shaft. A spring is in contact with the pressure plate whereby the spring urges the pressure plate into the engaged position and compression of the spring releases pressure on said pressure plate allowing for movement of said pressure plate to the disengaged position. The cover has a continuous curved surface to resist deflection and prevent premature failure of the cover. The continuous curved surface has a varying radius of curvature over a length of the curved surface.

In another aspect of the invention, a cover for a friction clutch assembly connecting driving and driven shafts is mounted on a flywheel of the driving shaft in a fixed axial position relative to the flywheel and for conjoint rotation with the flywheel. The cover has a continuous curved surface with a varying radius of curvature over a length of the curved surface.

Another aspect of the invention is a method of indexing at least one spacer of a friction clutch assembly connecting driving and driven shafts. The spacer is releasably attached to a cover and a flywheel for conjoint rotation therewith and is slidably received by a pressure plate. The spacer is adapted for engaging the pressure plate upon rotation of the flywheel for the transmission of torque from the flywheel to the pressure plate. The method comprises the steps of releasing the spacer from the cover. The spacer prior to release being in a first position relative to the cover in which a first contact surface of the spacer is disposed for primary contact with the pressure plate in use. The spacer is rotated to a second position so that a second surface of the spacer is aligned for primary engagement with the pressure plate in use and the first contact surface is aligned to be free from primary contact with the pressure plate. The spacer is secured to the cover in the second position.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
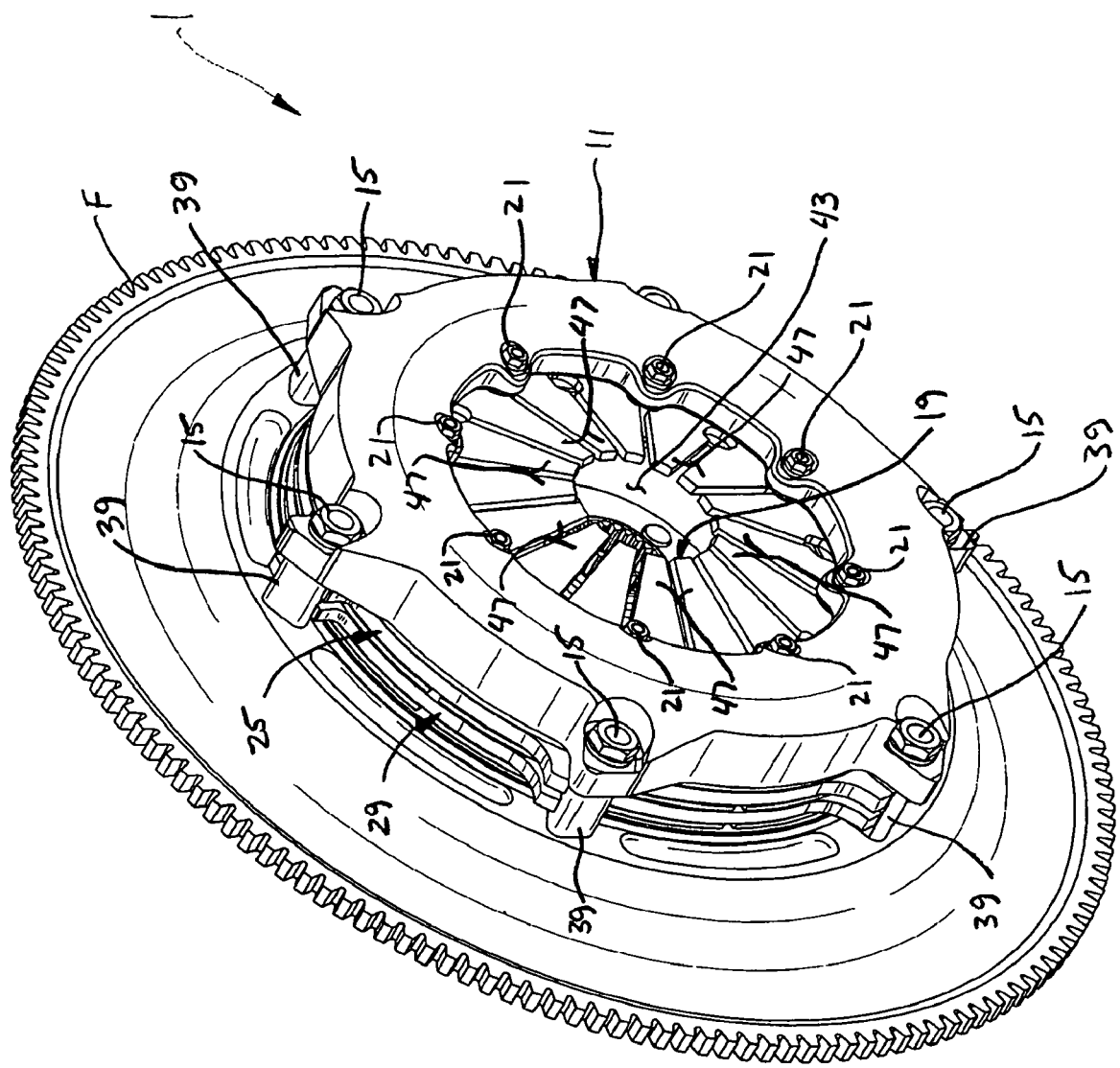
FIG. 1 is a perspective of a friction clutch assembly of the present invention.
Figure 2:
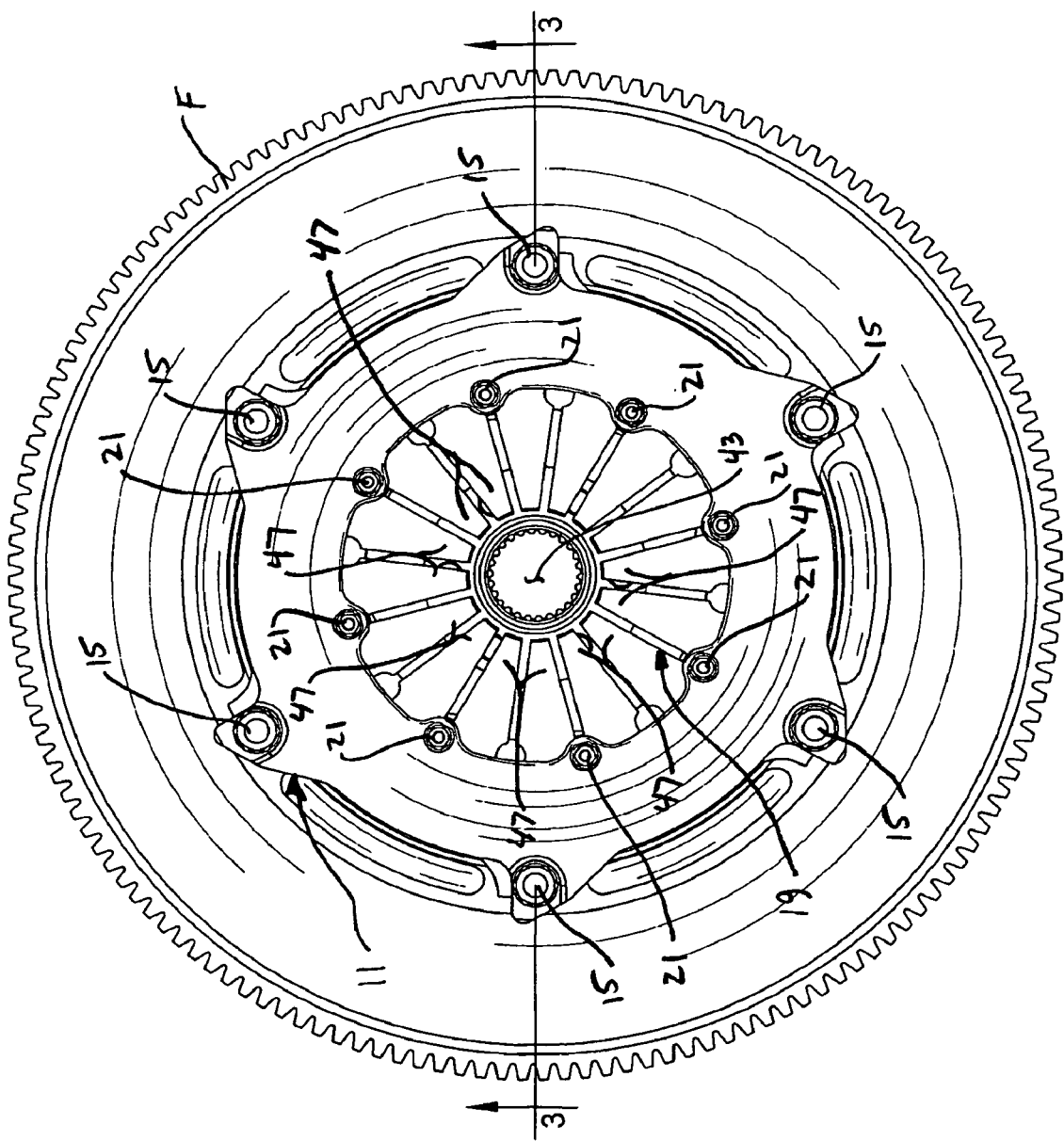
FIG. 2 is a top plan view of the clutch assembly.
Figure 3:
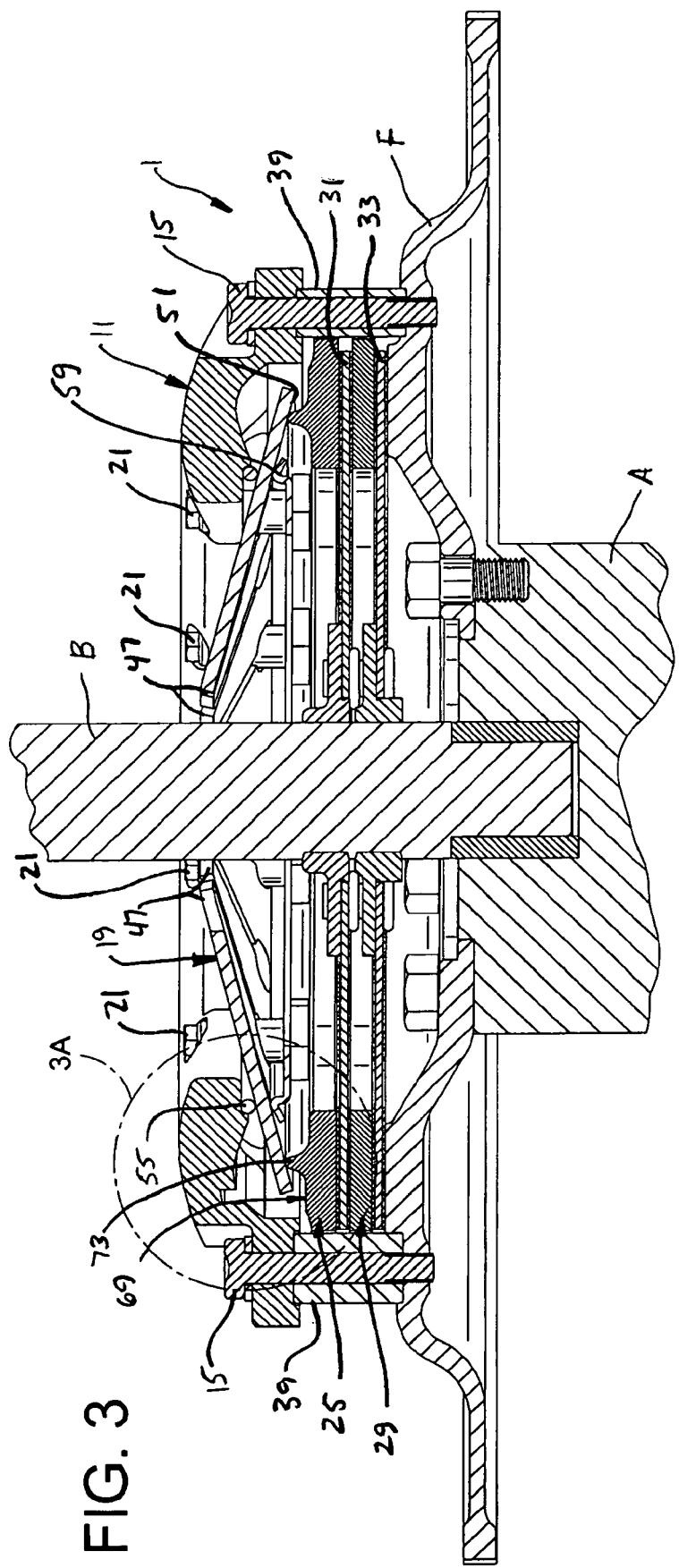
FIG. 3 is a cross-section generally as taken along the plane including line 3—3 of FIG. 2 but further illustrating a driving and driven shaft.

Referring now to the drawings, and first to FIGS. 1–3, a friction clutch assembly of the present invention is generally indicated at 1. The friction clutch assembly interconnects a powered, driving shaft A to a driven shaft B. Typically the driving shaft A is an engine crankshaft of an automotive vehicle which is attached to a flywheel F, and the driven shaft is a transmission gearbox input shaft. The driving shaft A and driven shaft B are axially aligned and can be operatively connected through the clutch 1 so that torque is transmitted and the shafts rotate together. A driver of the vehicle uses the clutch 1 to selectively disconnect the shafts A, B, interrupting the transmission of torque, in order to permit a gear shifting operation in the transmission.

Figure 4:
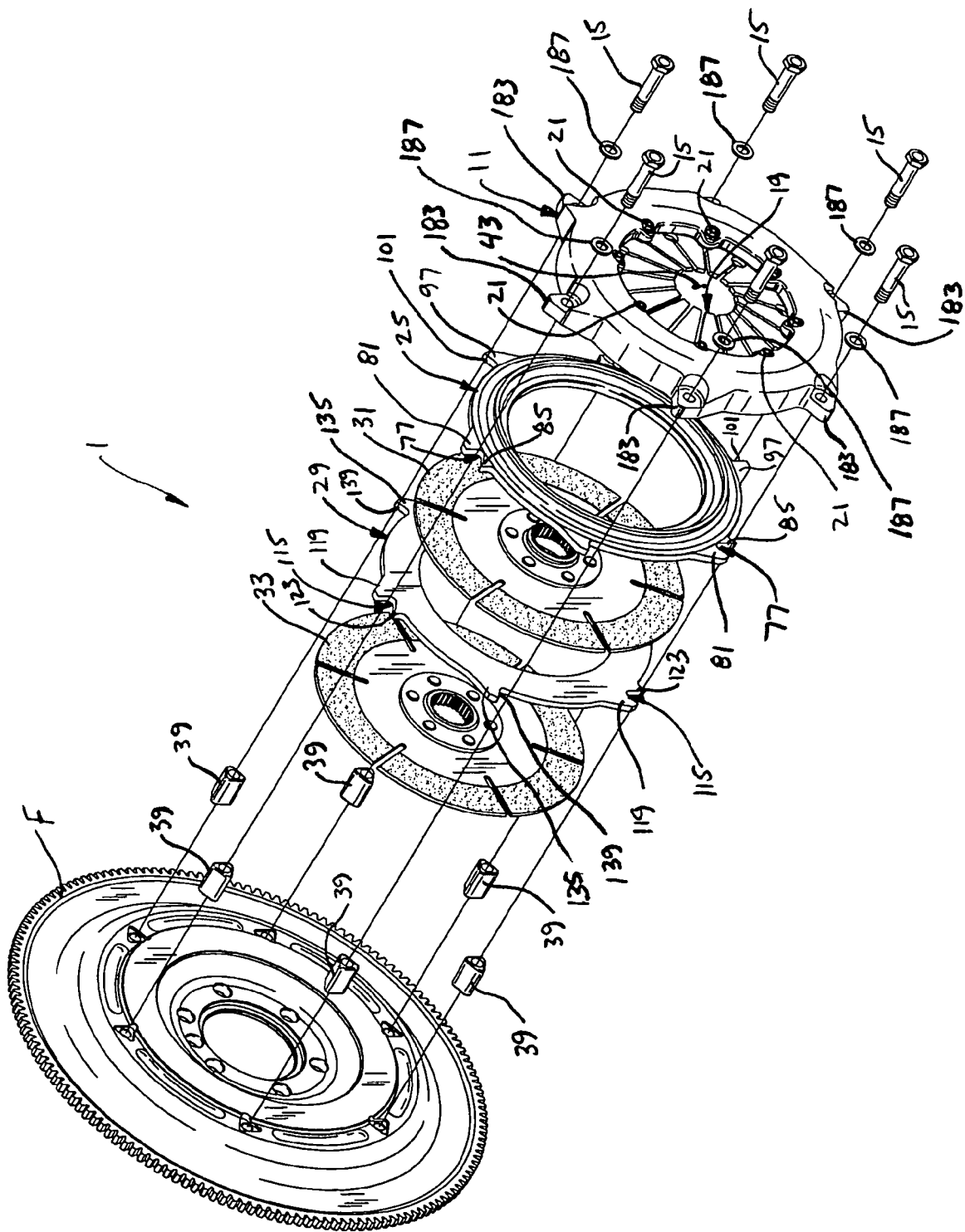
FIG. 4 is an exploded perspective of the friction clutch assembly.
Figure 5:
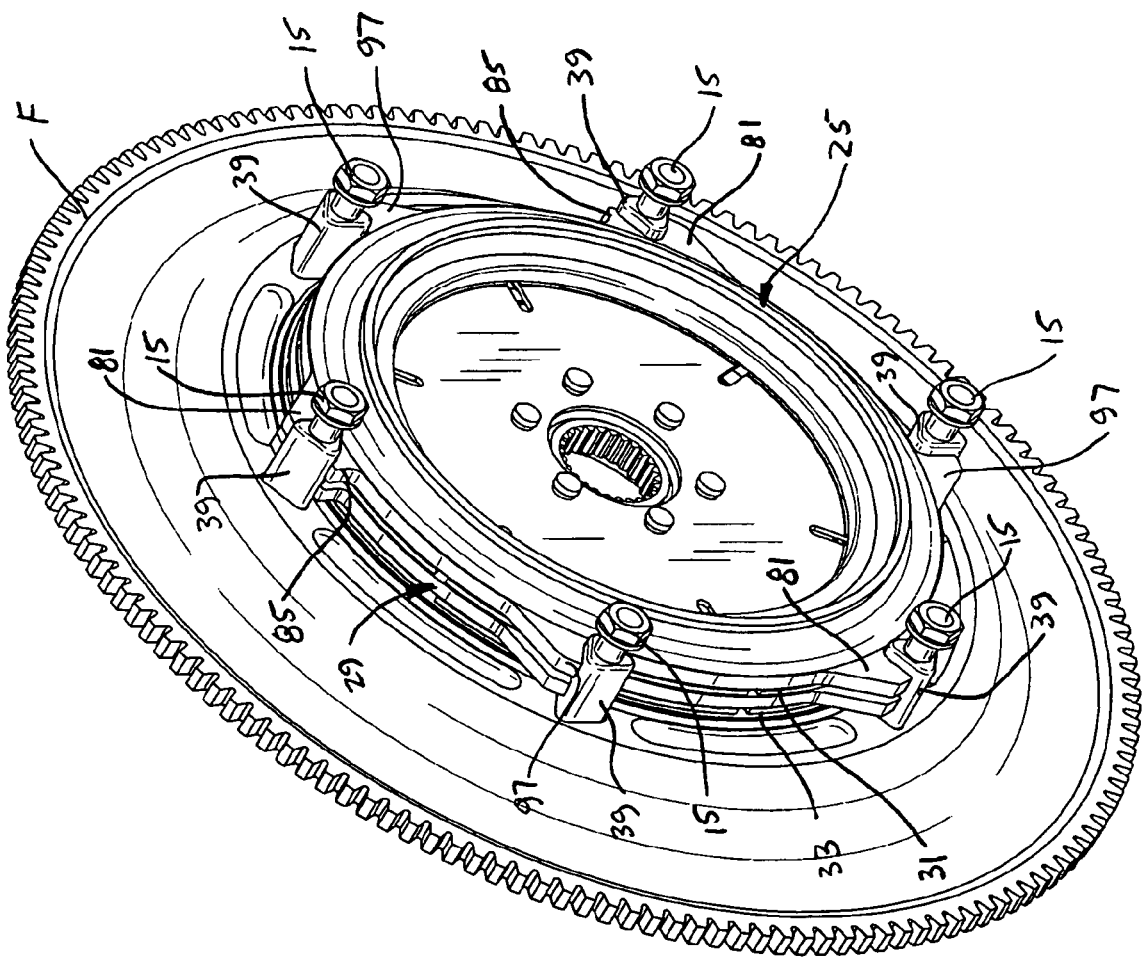
FIG. 5 is a perspective similar to FIG. 1 but with a cover removed to show details of the assembly.

As seen in FIGS. 3 and 4, the friction clutch assembly 1 includes a cover, generally indicated 11, attached to the flywheel F by conventional fasteners 15 for fixed rotational engagement with the driving shaft A. In the illustrated embodiment, a spring, generally indicated 19, is connected to the cover 11 via conventional fasteners 21. A pressure plate, generally indicated 25, a floater plate, generally indicated 29, and two friction disks 31, 33 are positioned between the spring 19 and the flywheel F. The floater plate 29, like the pressure plate 25, is fixed for conjoint rotation with the cover 11 and flywheel F. As is known, the friction disks 31, 33 are axially moveable on the driven shaft B but are in fixed rotational engagement with the shaft. As best seen in FIG. 3, one of the friction disks 31 is interposed between pressure plate 25 and the floater plate 29, and the other friction disk 33 is interposed between the floater plate and the flywheel F. It will be understood that the number of floater plates 29 and friction disks 31, 33 may vary without departing from the scope of this invention.

The threaded fasteners 15 attaching the cover 11 to the flywheel F are received through spacers 39 (commonly referred to as "stands") that are held in clamped engagement between the cover 11 and the flywheel F. In the illustrated embodiment, six spacers 39 are shown that correspond with the six threaded fasteners 15 connecting the cover 11 and the flywheel F. The spacers 39 are clamped between the cover 11 and the flywheel F for conjoint rotation therewith. As described below in more detail, the spacers 39 engage the peripheral edges of the pressure plate 25 and the floater plate 29 so that the axially moveable plates rotate with the cover 11 and the flywheel F.

Figure 3A:
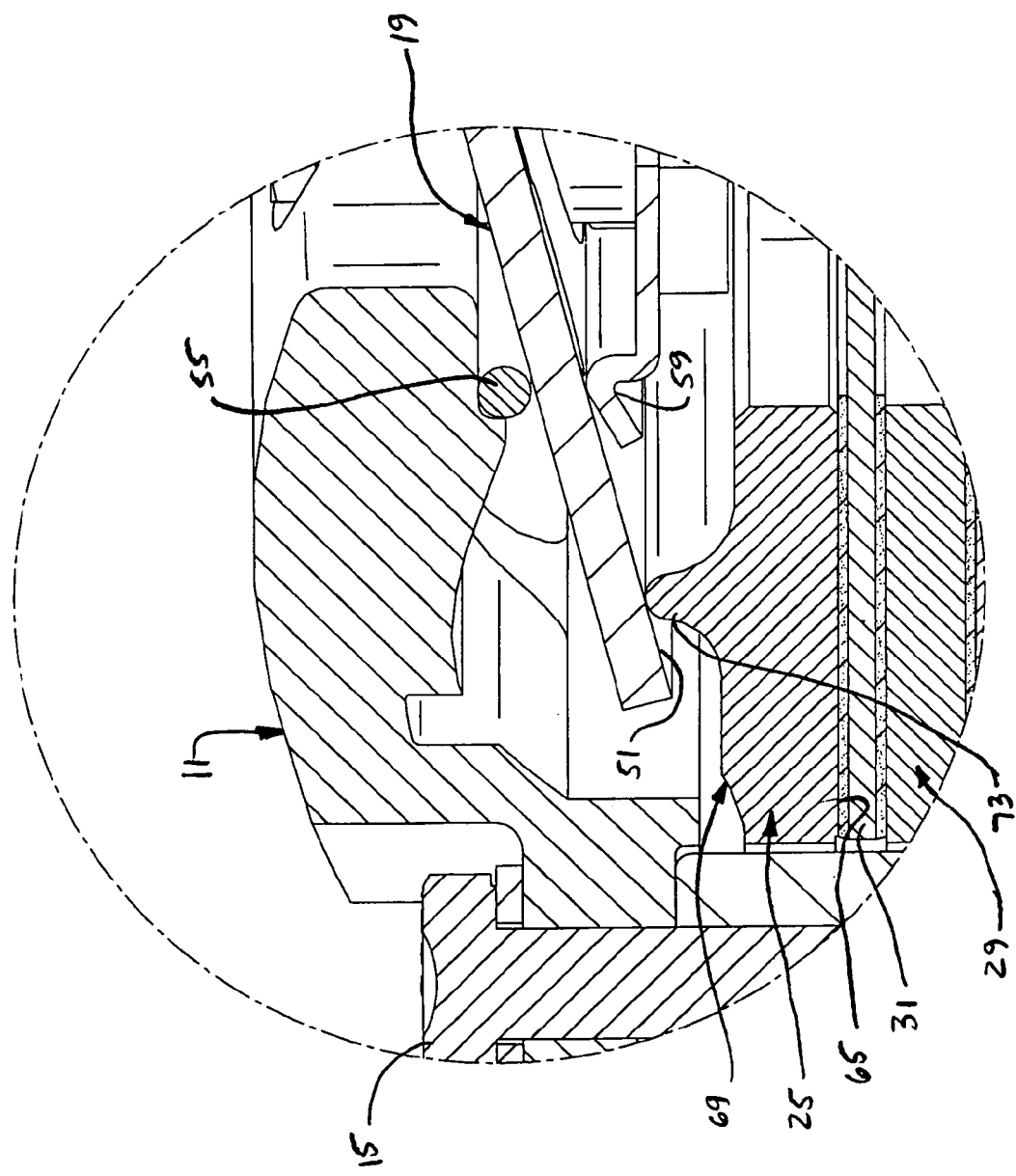
FIG. 3A is an enlarged fragment indicated by the circle 3A in FIG. 3.

In the illustrated embodiment, the spring 19 is a diaphragm spring, commonly referred to as a Belleville spring, but it will be understood that the spring could be other types (e.g., coil spring) conventionally used in clutch assemblies. As shown in FIGS. 1 and 2, the spring 19 has a plurality of radial slots extending outward from a center opening 43 of the spring to define a plurality of radial fingers 47 that project upwardly through the central opening of the cover 11. As best shown in FIGS. 3 and 3A, the spring 19 has an outer annular portion 51 that is biased to press against the pressure plate 25 to apply an axial force from the spring urging the pressure plate to the engaged position wherein the friction disks 31, 33 are clamped in rotational engagement with the flywheel F. The outer annular portion 51 of the spring 19 is held between a pivot ring 55 that contacts the cover 11 and a lower support ring 59 held in place by the fasteners 21 connecting the spring to the cover. The spring 19 is positioned between the pivot ring 55 and the lower support ring 59 so that the outer annular portion 51 of the spring pivots away from the pressure plate 25 when the radial fingers 47 are depressed axially inward towards the pressure plate. In the engaged position of the pressure plate 25 shown in FIG. 3, the biasing force of the spring 19 against the pressure plate clamps the first friction disk 31 between the pressure plate and the floater plate 29, and the second friction disk 33 between the floater plate and the flywheel F so that torque from the driving shaft A is transmitted to the driven shaft B via the rotational engagement of the flywheel, the pressure plate, the floater plate and the friction disks. When the radial fingers 47 of the spring are depressed by a release bearing (not shown) actuated by the clutch pedal of the vehicle, the outer annular portion 51 of the spring 19 pivots away from the pressure plate 25 to allow the pressure plate to move axially towards the cover 11 to a disengaged position in which the friction disks 31, 33 are no longer rotationally engaged with the flywheel F.

Figure 8:
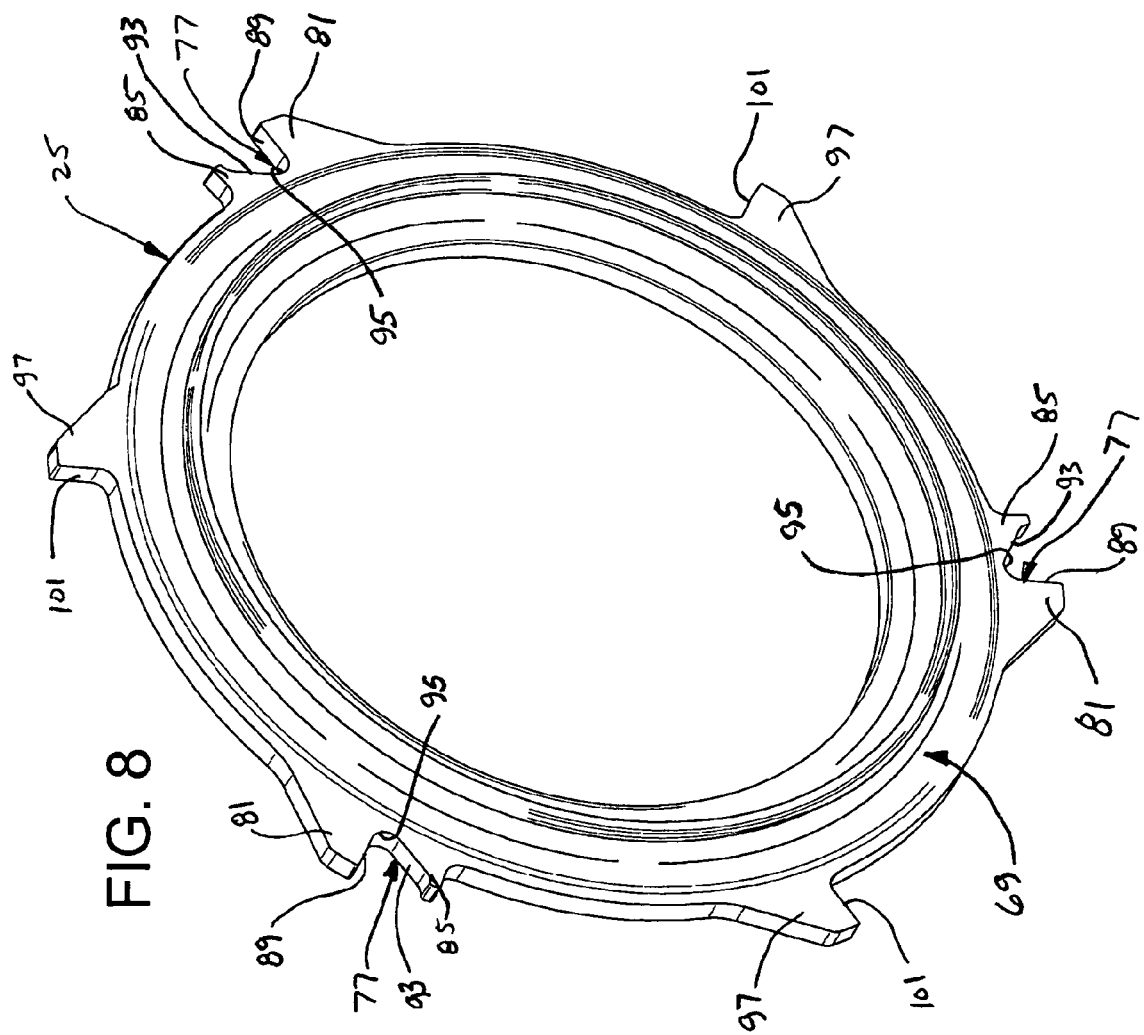
FIG. 8 is a perspective of the pressure plate.

As shown in FIGS. 3A and 8, the pressure plate 25 is generally annular and has a flat external surface 65 (FIG. 3A) for engaging the first friction disk 31 and an opposite, contoured external surface, generally indicated 69, for engaging the outer annular portion 51 of the spring 19. As shown in FIGS. 3 and 3A, the contoured outer surface 69 of the pressure plate 25 has a raised portion 73 for contact with the outer annular portion 51 of the spring 19. The pressure plate 25 has three generally V-shaped notches, generally indicated 77 (FIG. 8), formed at its outer peripheral edge for slidable engagement with the spacers 39. The notches 77 are spaced approximately 120 degrees apart at the circumferential edge of the pressure plate 25. In the illustrated embodiment, each notch 77 is defined between a stop 81 and an adjacent tab 85 protruding from the generally circular peripheral edge of the pressure plate 25.

Figure 6:
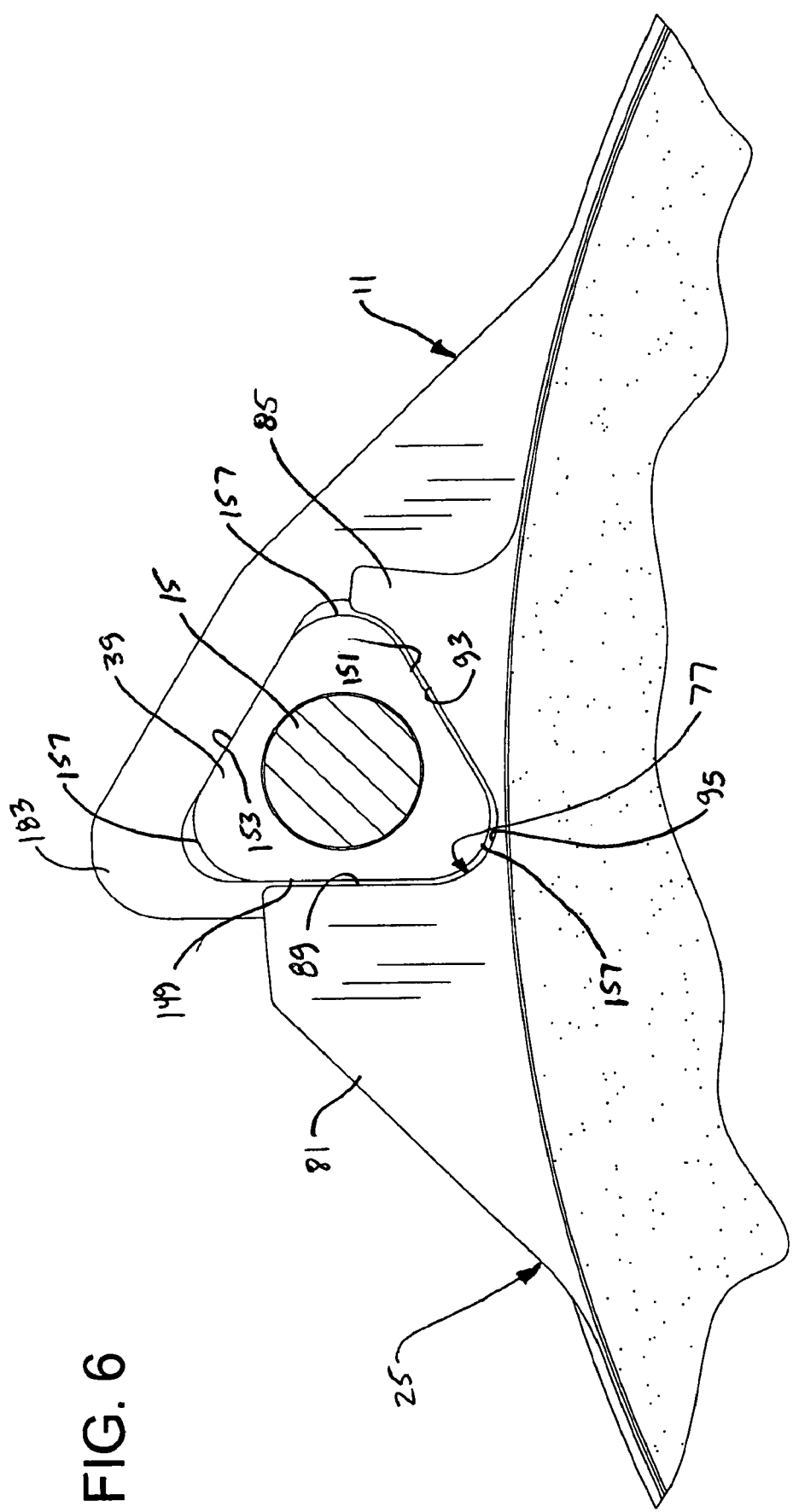
FIG. 6 is an enlarged fragment of the assembly viewed from the bottom with a flywheel removed to show details of a spacer received by a pressure plate and the cover.
Figure 6A:
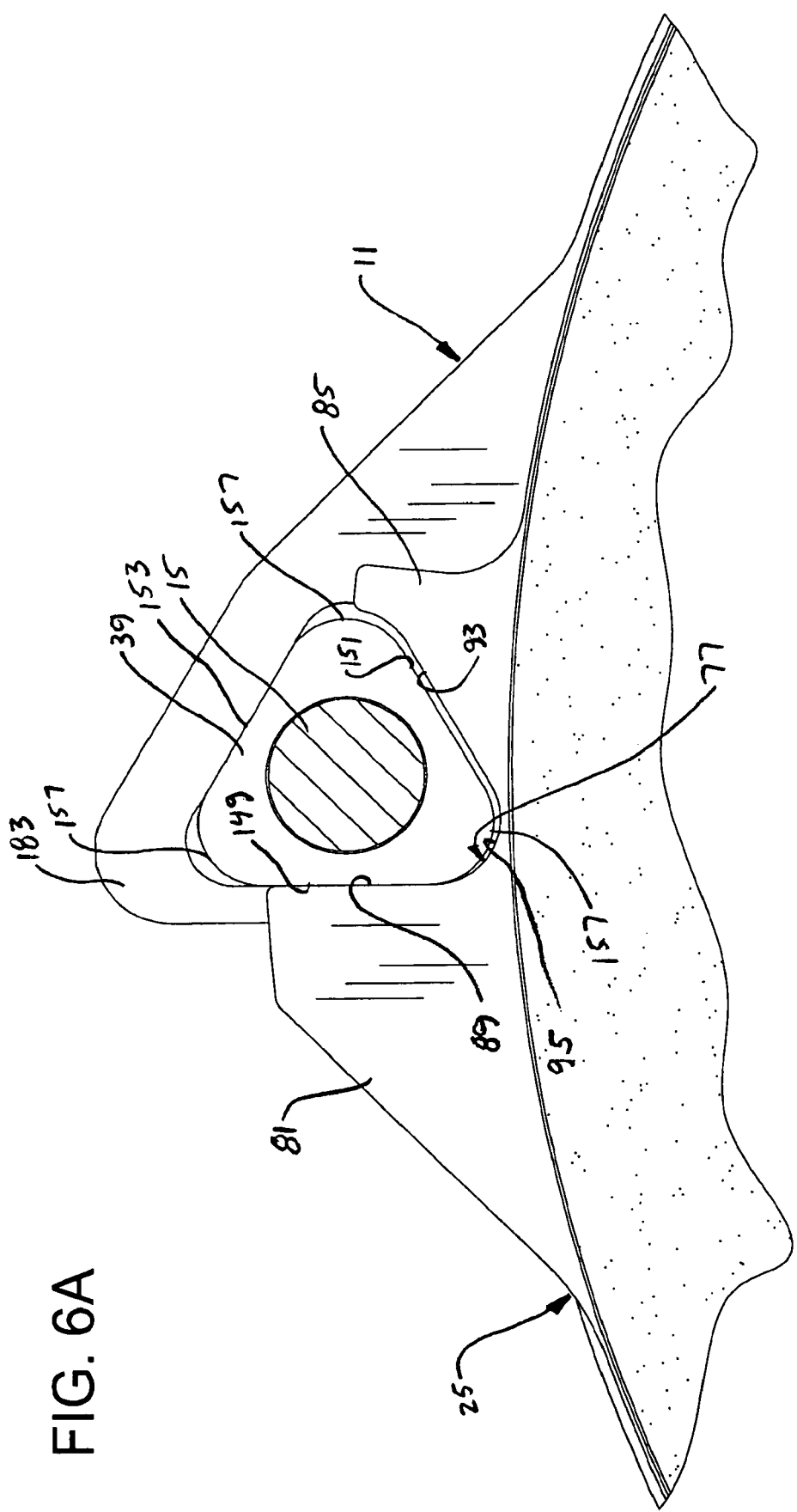
FIG. 6A is a view similar to FIG. 6 but showing the spacer engaging a first contact surface of the pressure plate.
Figure 6B:
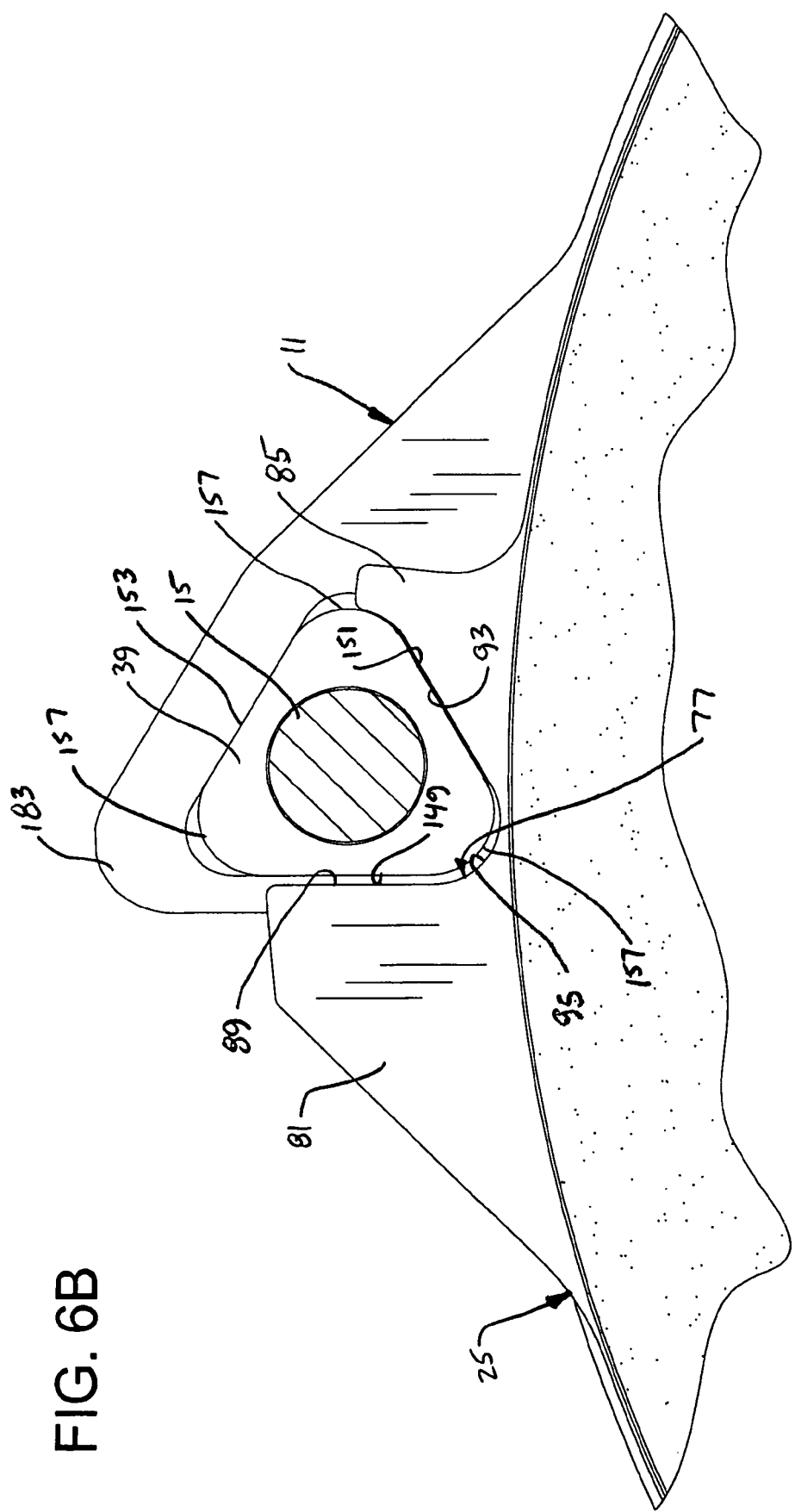
FIG. 6B is a view similar to FIG. 6 but showing the spacer engaging a second contact surface of the pressure plate.

As seen in FIGS. 6–6B, each notch 77 has a first (primary) contact surface 89 defined by a planar portion of each stop 81 and a second contact surface 93 defined by a planar portion of each tab 85. The first and second contact surfaces 89, 93 of each notch 77 are joined at a rounded corner 95 at the junction of each adjacent stop 81 and tab 85. In the illustrated embodiment, the first contact surface 89 of the notch 77 is an engaging surface of the stop that is substantially perpendicular with a horizontal tangent of the pressure plate 25. The second contact surface 93 of the notch 77 is an engaging surface of the tab 85 that is angled approximately 60 degrees from the first contact surface 89 and approximately 30 degrees from a horizontal tangent of the pressure plate 25. Upon rotation of the driving shaft A (and cover 11) in one direction (counterclockwise as viewed from FIGS. 6–6B), the spacers 39 affixed to the flywheel F rotate so that the first contact surface 89 of each notch 77 engages a respective spacer along a conformal plane of engagement corresponding with the engaging surface of each stop (FIG. 6A). When the engine speed is reduced, the rotating flywheel F and spacers 39 decelerate causing the second contact surface 93 of each notch 77 to engage the spacers along a conformal plane of engagement corresponding with the angled engaging surface of each tab 85. At the very least, engagement of the spacers 39 with either of the contact surfaces 89, 93 of each notch 77 occurs along a line (and not merely at a single point of contact).

As best seen in FIG. 8, the pressure plate 25 has three teeth 97 protruding from the outer peripheral edge of the plate that are circumferentially located between adjacent V-shaped notches 77. The teeth 97 are substantially similar to the stops 81 that cooperate with the tabs 85 to form the V-shaped notches 77 of the pressure plate 25. Each tooth 97 has an external contact surface 101 substantially perpendicular with a tangent of the circular peripheral edge of the pressure plate 25 at the location of the tooth. The contact surface 101 of each tooth 97 is sized and shaped similar to the first contact surface 89 of the V-shaped notches 77. Upon acceleration, the contact surface 101 of each tooth 97 engages a respective spacer 39 upon rotation of the drive shaft in the first direction. As seen in FIG. 8, the teeth 97 are located approximately 120 degrees apart at the circumferential edge of the pressure plate 25.

As shown in FIG. 4, the floater plate 29 has a construction similar to the pressure plate 25 except the floater plate does not have a contoured external surface for contact with the spring 19. Rather, the floater plate 29 is positioned between the first and second friction disks 31, 33 and has a generally uniform cross-sectional thickness. The floater plate 29 has generally V-shaped notches, generally indicated 115, at its periphery for engaging corresponding spacers 39 upon rotation of the driving shaft A. Each V-shaped notch 115 is substantially similar to the notches 77 on the pressure plate 25 in that each notch is formed by cooperating stops 119 and tabs 123 that form first and second contact surfaces that engage a respective spacer 39. Also, the floater plate 29 has three teeth 135 (only two are shown), each defining a single contact surface 139. The teeth 135 are circumferentially spaced between the three notches 115 for engagement with corresponding spacers 39 of the clutch assembly 1. As shown in FIG. 4, the V-shaped notches 77, 115 and the teeth 97, 135 of the pressure plate and the floater plate 29 are generally aligned to slidably receive the spacers 39 of the clutch assembly 1. The respective V-shaped notches 77, 115 and teeth 97, 135 of the pressure plate 25 and the floater plate 29 engage the spacers 39 along substantially parallel planes of engagement that are axially spaced on the external surface of each spacer. It is believed that at the very least the engagement occurs along a line of contact and not only at a point It will be understood that a pressure plate and a floater plate having more or less than three notches and/or teeth could be provided and that the notches and/or teeth may have other spacing without departing from the scope of this invention.

Each spacer 39 is fixedly attached to the cover 11 and the flywheel F for conjoint rotation therewith. As seen in FIGS. 1 and 3 each spacer 39 receives a threaded fastener 15 that connects the cover 11 to the flywheel F. In the illustrated embodiment, six spacers 39 are shown but it will be understood that more or less than six spacers could be provided without departing from the scope of this invention. Each spacer 39 engages a respective V-shaped notch 77, 115 or tooth 97, 135 of the pressure plate 25 and floater plate 29 so that torque is transmitted between the flywheel F and the plates. The external surface of the spacer 39 is slidably received by the pressure plate 25 and floater plate 29 to allow axial movement of the pressure plate and the floater plate between the engaged position and the disengaged position of the clutch assembly.

Figure 7:
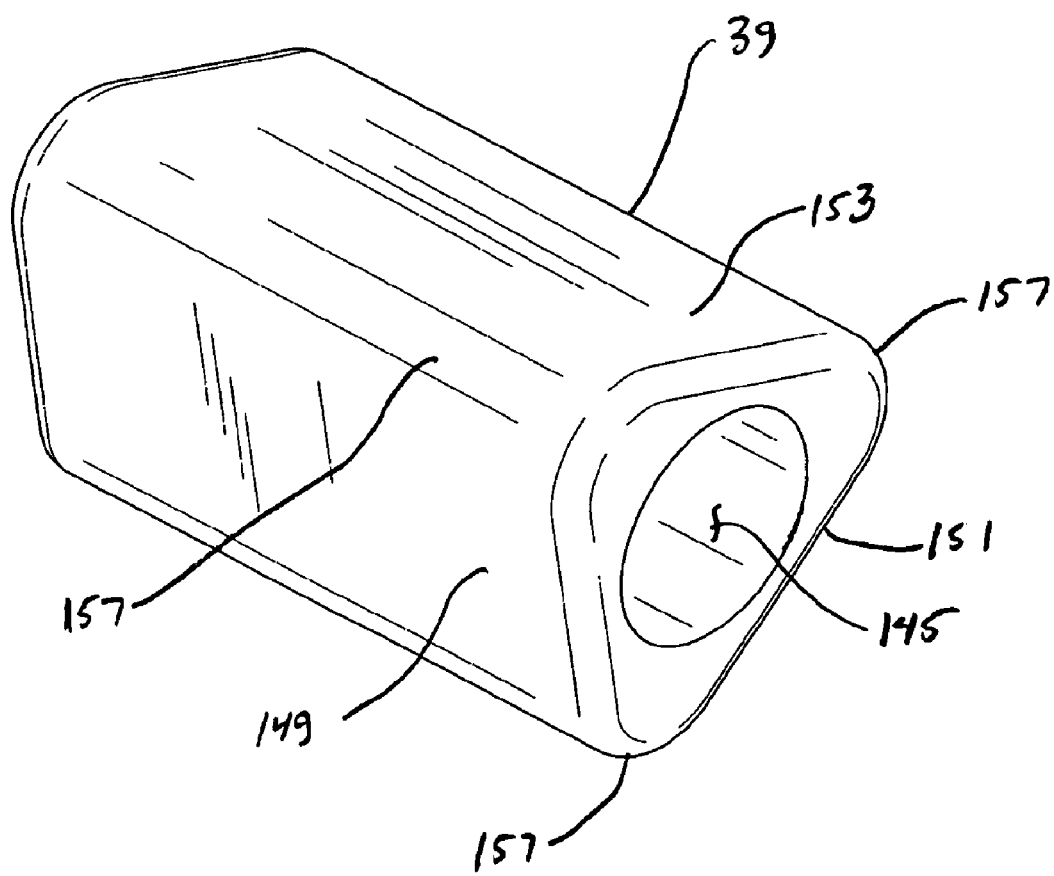
FIG. 7 is a perspective of the spacer.

As best seen in FIG. 7, each spacer 39 has a generally triangular cross-sectional shape with an axial bore 145 for receiving one of the threaded fasteners 15 through the spacer and into the flywheel F. Each spacer 39 has an external surface that comprises three substantially flat sides 149, 151, 153 that are joined by rounded corners 157. It will be understood that as used herein "external surface" may refer to any one or all of the sides 149, 151, 153. As seen in FIGS. 6–6B, the external surface of each spacer 39 comprises a first contact surface comprising the flat side 149 and a second contact surface comprising the flat side 151 of the spacer that are shaped for conformal engagement with the V-shaped notch 77 of the pressure plate 25. As shown in FIG. 6A, each of the first contact surfaces 149 of each spacer 39 engages a respective first contact surface 89 of each V-shaped notch 77 of the pressure plate 25 along a plane of engagement corresponding with the perpendicular external surface of the stop 81 upon rotation of the flywheel F and cover 11 in the first rotational direction (counter-clockwise as viewed from FIG. 6A). As seen in FIG. 6B, each of the second contact surfaces 151 of each spacer 39 engages a respective second contact surface 93 of each V-shaped notch 77 of the pressure plate 25 along a plane of engagement corresponding with the angled external surface of each tab 85 upon deceleration of the flywheel. As shown in FIG. 4, the pressure plate 25 and floater plate 29 are substantially aligned for conformal engagement with the spacers 39 so that the first contact surfaces of each respective V-shaped notch 77, 115 of the pressure plate 25 and the floater plate 29 engage respective spacers 39 along a parallel plane of engagement. Also, the pressure plate 25 and floater plate 29 are aligned such that the contact surfaces 101, 139 formed by the respective teeth 97, 135 of the pressure plate 25 and the floater plate 29 engage a respective spacer 39 along a parallel plane of engagement.

The cover 11 is mounted in a fixed axial position relative to the flywheel F and forms a reaction surface for the spring 19 so that the spring is biased against the axially moveable pressure plate 25 to keep the clutch assembly 1 in the engaged position. The spring force acting against the pressure plate 25 needs to be greater for engines that operate at higher speeds (e.g., racing vehicles) so that sufficient force is provided to keep the clutch assembly 1 in the engaged position. As the spring force increases, the corresponding reaction forces acting on the cover 11 increase causing deflection and fatigue of the cover.

Figure 9:
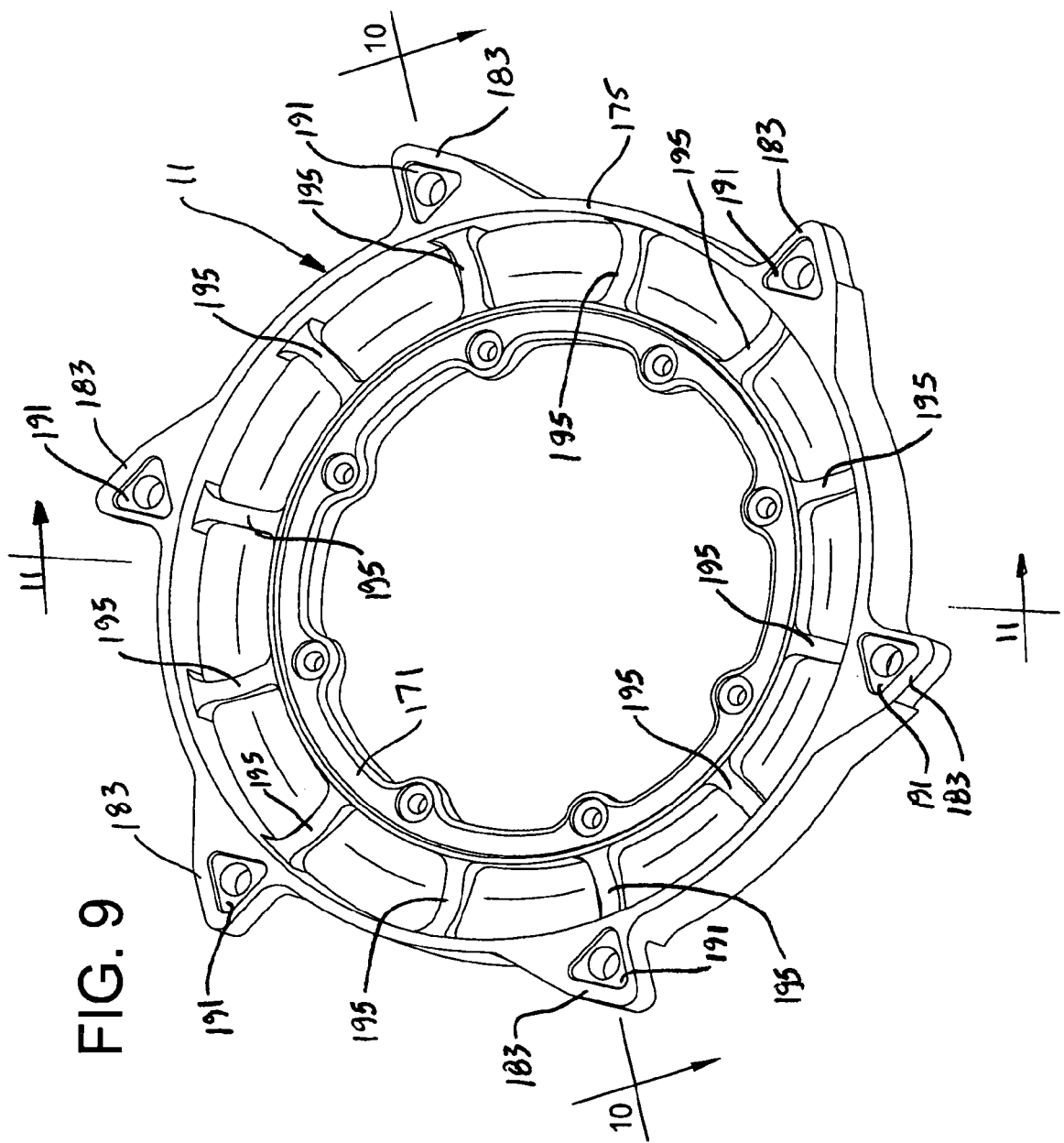
FIG. 9 is a bottom perspective of the cover.
Figure 10:
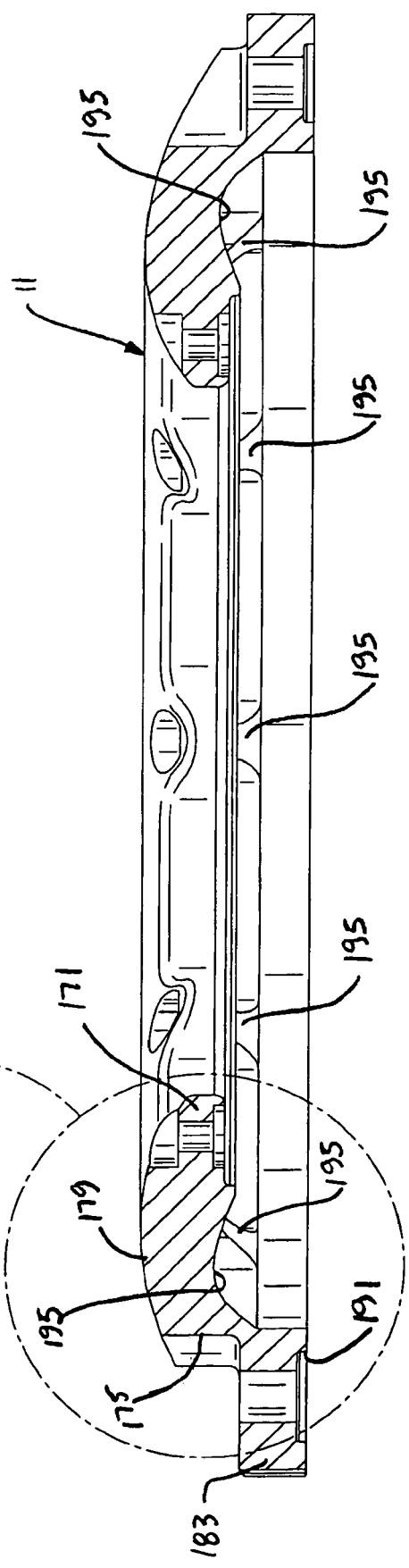
FIG. 10 is a cross-section taken along the plane including line 10—10 of FIG. 9.
Figure 11:
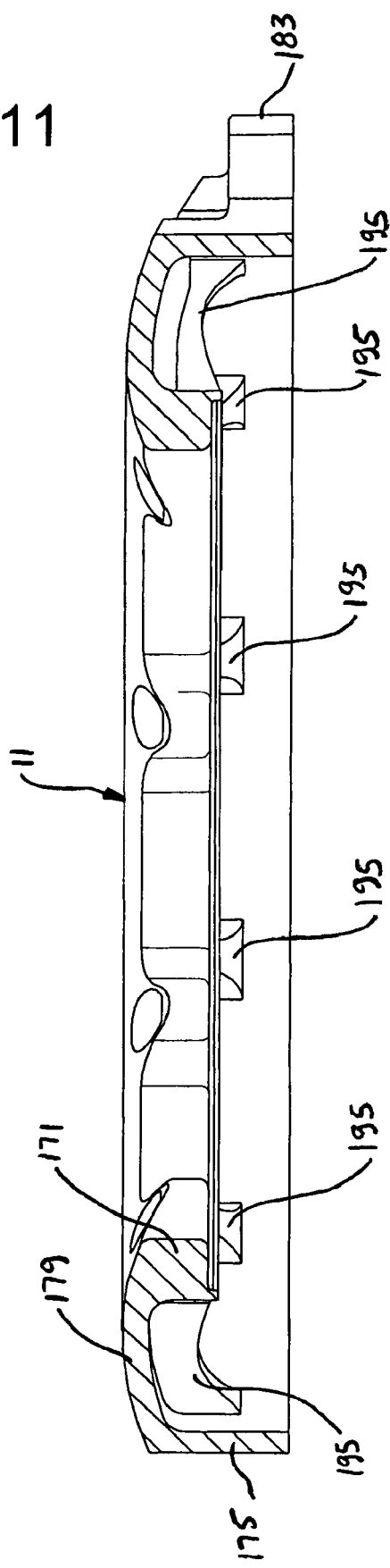
FIG. 11 is a cross-section taken along the plane including line 11—11 of FIG. 9.

As best seen in FIGS. 9–11, the cover 11 has an annular inner wall 171, an annular outer wall 175 and a curved upper wall 179 spanning between the inner and outer walls. In the illustrated embodiment, the cover 11 has six flanges 183 at the peripheral edge of the outer wall 175 that receive a washer 187 (FIG. 4) interposed between the head of a respective threaded fastener 15 (FIG. 4) on the external side of the flange. The internal side of the flange 183 has a recess 191 for receiving an end portion of a respective spacer 39.

Figure 10A:
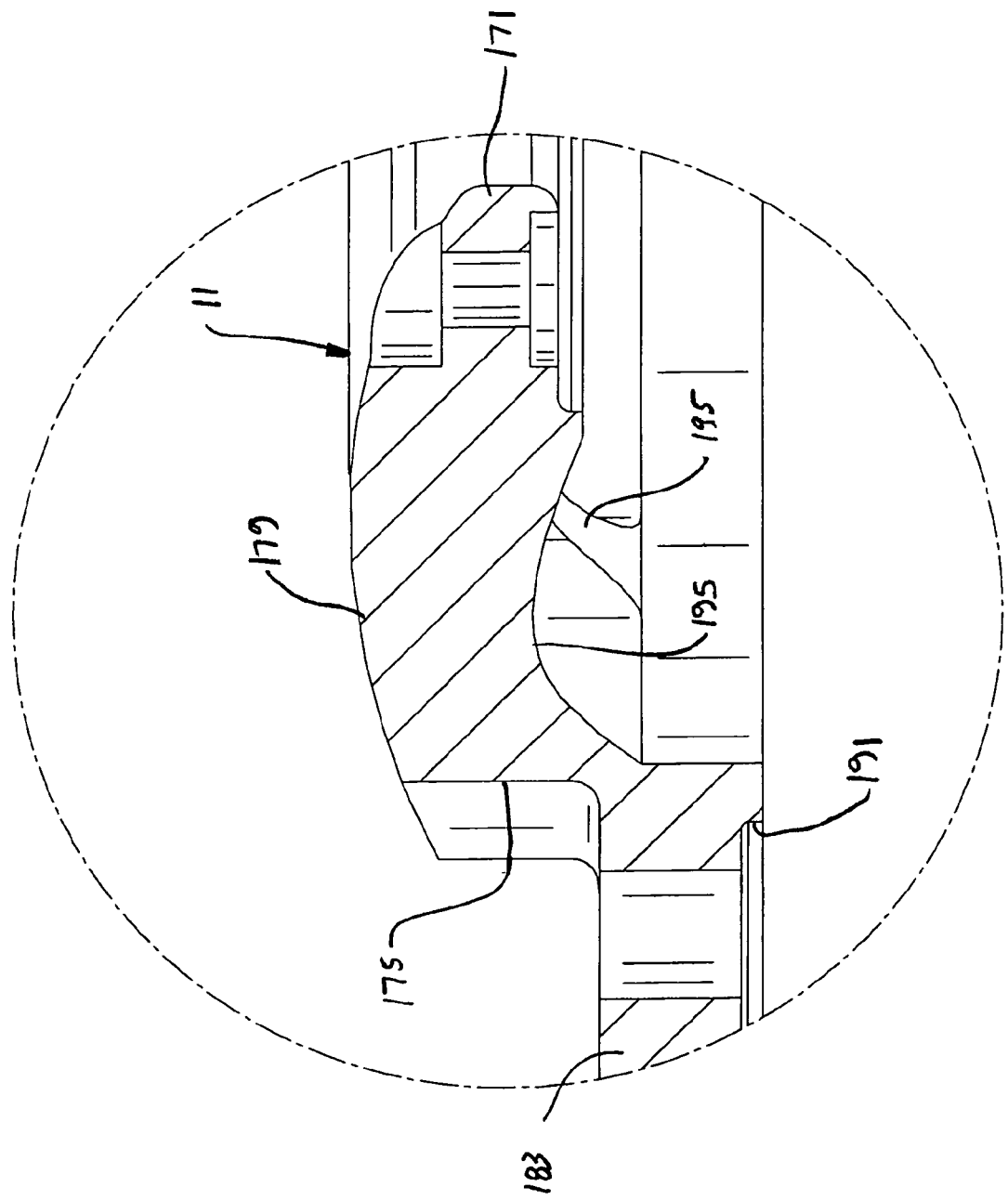
FIG. 10A is an enlarged portion of FIG. 10.

As best shown in FIG. 10A and 11, the axially outer surface of the upper wall 179 has a varying radius of curvature over the radial length of the surface between the annular inner wall 171 and annular outer wall 175 of the cover 11. The cover has spaced apart radial webs 195 on the inner surface of the upper wall 179 that span between the annular inner wall 171 and annular outer wall 175 of the cover 11. The webs 195 provide enhanced structural integrity to the cover 11 to reduce deflection and prevent fatigue and failure of the cover. In the illustrated embodiment ten webs 195 are shown at approximately equal angular spacing around the cover 11, but it will be understood that the size, location and number of webs may vary or that webs may be omitted from the cover without departing from the scope of this invention. Each web 195 has a curved lower surface that defines the axially inner surface of the web. The curved lower surface of each web 195 has a varying radius of curvature across the radial length of the web. In the illustrated embodiment, the cover 11 is a forging with the webs 195 formed integrally with the upper wall 179. It will be understood that the cover 11 could be formed by other conventional machining processes (e.g., casting) and that the webs 195 may be formed separately and attached to the cover by conventional fastening methods (e.g., welding).

In one embodiment, the external surface of the upper wall 179 of the cover 11 is defined by a splined curve created by the polar equation $r(t)=1+\cos t$. In the illustrated embodiment, the external surface of the upper wall 179 conforms to the curve defined by the above equation where t ranges from approximately $\pi/12$ to $\pi/2$ radians (15 to 90 degrees). As seen in FIGS. 10A and 11, the radius of curvature of the curve defining the external surface of the upper wall 179 continually changes throughout the radial length of the curve. It will be understood that the curved external surface of the upper wall 179 and the lower curved surface of the webs 195 may be defined by other curves without departing from the scope of this invention.

The varying radius of curvature of the upper wall 179 further enhances the resistance to deflection of the cover 11 and results in a longer operational life of the cover. For example, finite element analysis was used to measure the deflection of the cover 11 resulting from a series of axial forces applied to the cover intended to simulate the reaction force of the spring 19. The magnitude of the forces applied in the analysis of the cover 11 ranged from 95 to 192 pounds. The curved cover 11 was shown to have a maximum deflection of approximately 0.0029 inches when subjected to the simulated spring force. A flat cover, similar to the cover plate 16 disclosed in coassigned U.S. Pat. No. 5,785,163, was also studied using the same finite element analysis techniques. The flat cover was shown to have a maximum deflection of approximately 0.0057 inches when subjected to the same simulated spring force as the curved cover 11. A comparison of the finite element analysis results for each cover shows that the cover 11 having a curved external surface of the upper wall 179 with a varying radius of curvature across the radial length of the surface results in approximately a 50% reduction in the maximum deflection of the cover.

In operation, the friction clutch assembly 1 of the present invention operates to selectively engage or disengage the driven shaft B from the driving shaft A of a vehicle. The spring 19 biases the pressure plate 25 to the engaged position in which the friction disks 31, 33 connected to the driven shaft B are clamped for rotational engagement with the flywheel F of the driving shaft A. The cover 11 is in a fixed axial position with respect to the flywheel F and receives the reaction force from the spring 19. The cover 11 has an upper wall 179 with a curved external surface and webs 195 having an curved internal surface that strengthen the cover to resist deflection due the reaction forces from the spring 19.

When the vehicle is accelerated transmitting torque to the driving shaft A, the spacers 39 rotate conjointly with the flywheel F attached to the driving shaft to engage the pressure plate 25 and the floater plate 29 along respective first contact surfaces of V-shaped notches 77, 115 and respective contact surfaces 101, 139 of teeth 97, 135. The torque required to accelerate the vehicle is transmitted from the driving shaft A to the pressure plate 25 and the floater plate 29 by the spacers 39 connected to the flywheel F. When the vehicle decelerates, the rotation of the driving shaft A is initially slower than that of the driven shaft B so that the spacers 39 engage the pressure plate 25 and the floater plate 29 along respective second contact surfaces of V-shaped notches 77, 115. When the clutch pedal of the vehicle is actuated, the biasing force of the spring 19 acting on the pressure plate 25 is released so that the pressure plate 25 and floater plate 29 are free to axially slide on the spacers 39 away from the flywheel F to relieve the clamping force acting on the friction disks 31, 33. When the clamping force against the friction disks 31, 33 is relieved, the friction disks are free to rotate independently of the pressure plate 25 and the flywheel F so that the driving shaft A and driven shaft B are free from fixed rotational engagement with each other.

A method of indexing at least one spacer 39 of the friction clutch assembly 1 of the present invention is accomplished by operating the friction clutch assembly so that one of the substantially flat sides 149 (FIG. 6A) of the spacer contacts the pressure plate 25 and floater plate 29 so that the plates rotate conjointly with the flywheel F. The spacer 39 is fixed in a first position relative to the cover 11 of the assembly 1 in which a first contact surface 149 of the spacer is disposed for primary contact with the pressure plate 25 in use. Upon rotation of the driving shaft A, the first contact surfaces 149 of respective spacers contact the first contact surfaces of the V-shaped notches 77, 115 and the contact surfaces 101, 139 of respective teeth 97, 135 of the pressure plate 25 and the floater plate 29. After stopping the engine of the vehicle that powers the driving shaft A, the clutch assembly 1 may be disassembled by releasing the spacer 39 from the cover 11 and removing the cover attached to the flywheel F by removing the threaded fasteners 15. After removing the cover 11, the spacers 39 are rotated 120 degrees to a second position where one of the other two substantially flat side surfaces 151, 153 of the spacers is aligned for primary engagement with the stops and teeth of the pressure plate 25 and floater plate 29. The flat side 149 of the spacer 39 that was previously the contact surface engaging the stops 81, 115 (or teeth 97, 135) of the pressure plate 25 and floater plate 29 is now rotated to be free from contact with the plates. After rotating the spacer 39 to the second position, the spacer is secured to the cover 11 by tightening the threaded fasteners 15 of the assembly 1. Indexing of the spacers 39 extends the life of the spacers by allowing a worn or damaged contact surface to be replaced without requiring replacement of the spacer.

Figure 12:
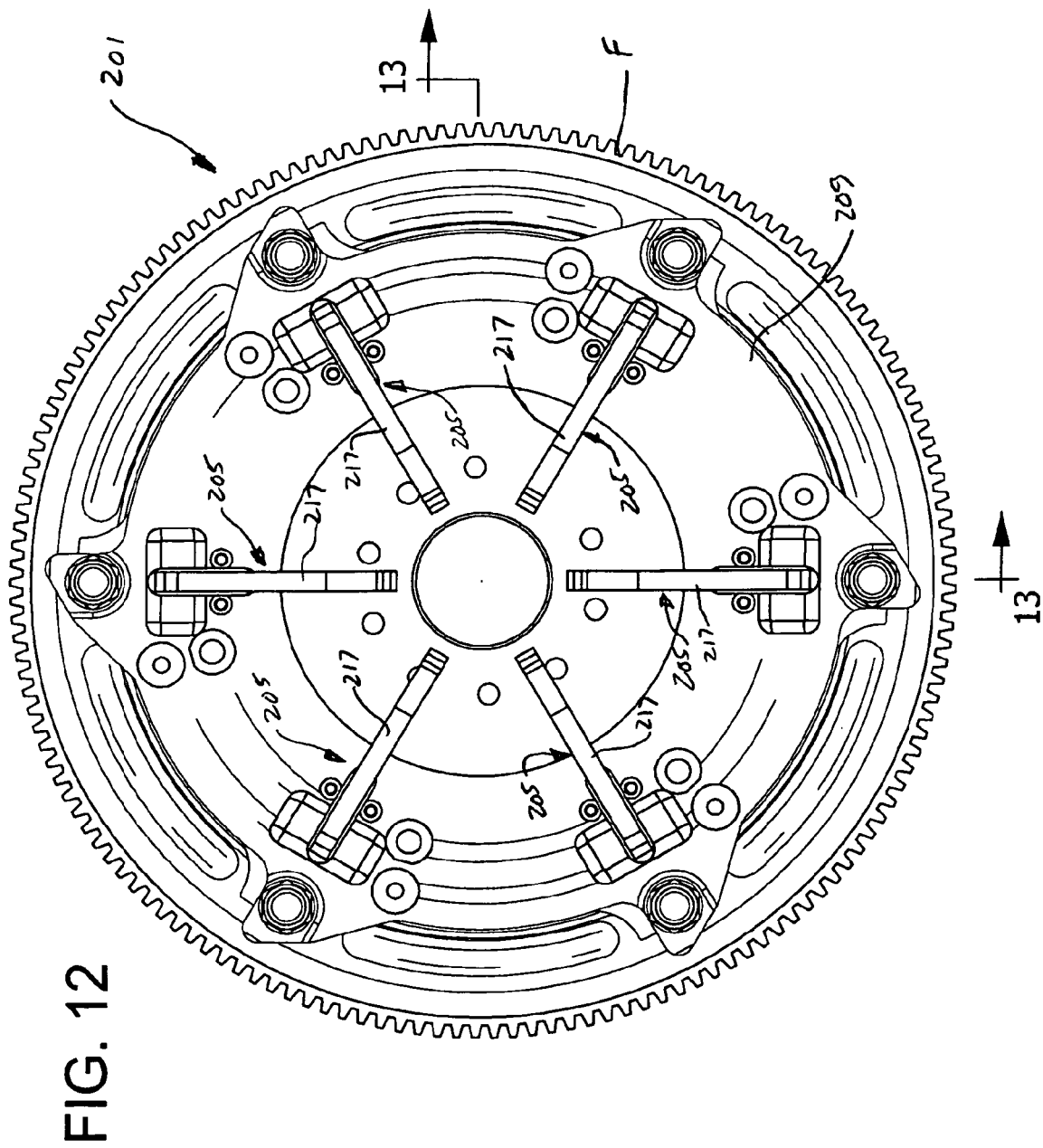
FIG. 12 is a top plan view of a second embodiment of the clutch assembly of the present invention.
Figure 13:
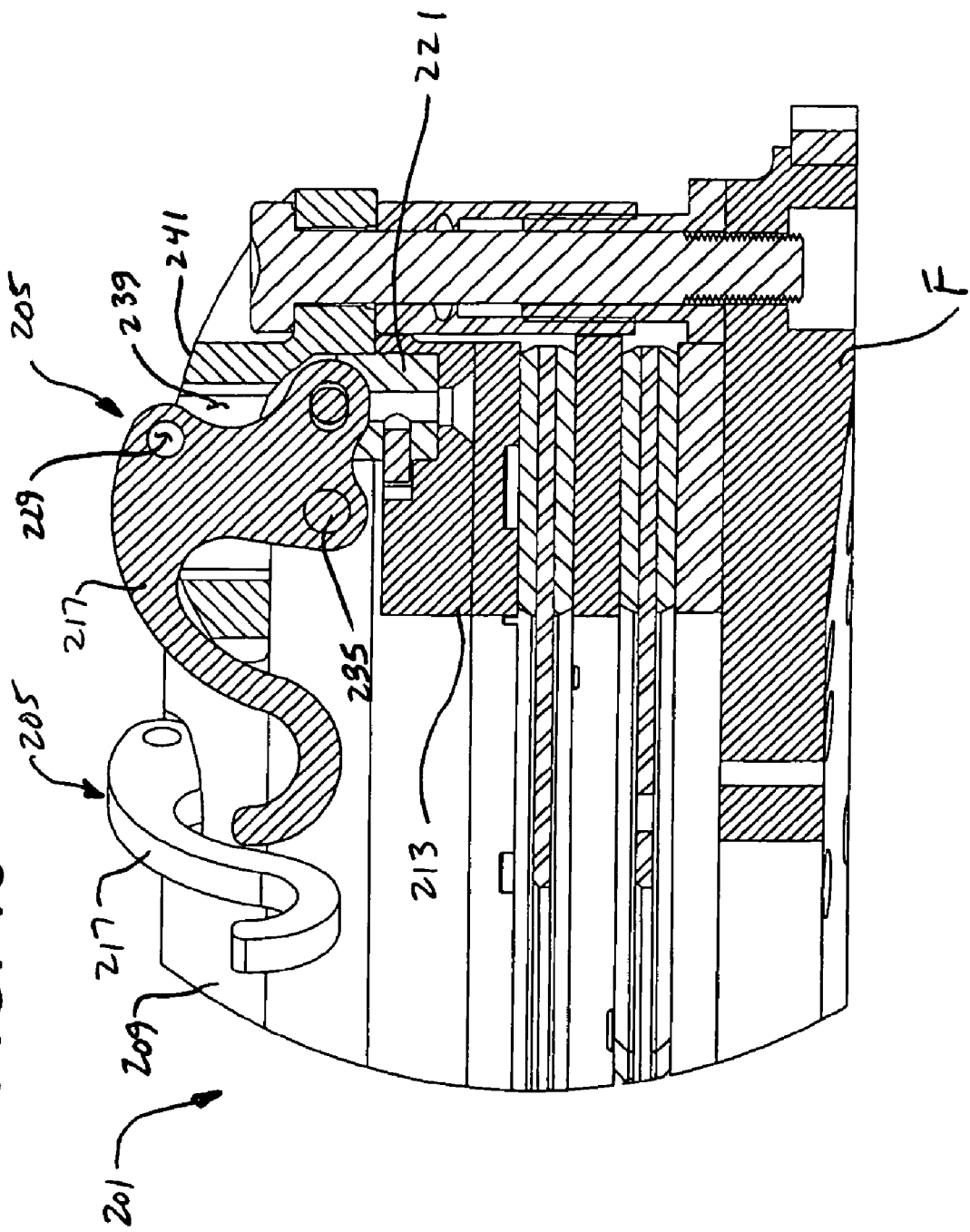
FIG. 13 is a cross-section taken along the plane including line 13—13 of FIG. 12.

FIGS. 12 and 13 illustrate a second embodiment of the clutch assembly, generally indicated 201. This embodiment is substantially similar to the assembly 1 of the first embodiment except that the assembly 201 includes multiple lever assemblies, generally indicated 205, mounted on the cover 209 to provide a centrifugal assist force to the pressure plate 213. The lever assemblies 205 are similar to the lever assemblies disclosed in U.S. Pat. No. 5,785,163, incorporated by reference herein for all purposes. As shown in FIG. 12, the lever assemblies 205 include a lever 217 pivotably connected to the cover 209 and connected to a pressure pin 221 (FIG. 13) that is mounted on the pressure plate 213. The lever 217 has an opening 229 in a portion of the lever that protrudes from the cover 209 for mounting centrifugal weights (not shown). The lever 217 pivots about a pin 235 connecting the lever to the cover 209 in response to rotation of the flywheel F and cover to provide increased clamping force to the pressure plate 213 as the rotational speed of the flywheel and cover is increased.

The curved cover 209 is similar in shape to the cover 11 of the assembly 1 of the first embodiment except that the cover has an opening 239 for housing the lever assemblies 205. The cover 209 has an annular upper wall 241 with an external surface that has a varying radius of curvature over the radial length of the surface. In the illustrated embodiment 201 the external surface of the top wall 241 is defined by the polar equation $r(t)=1+\cos t$, but it will be understood that the external surface may have other shapes defined by other equations. The external surface defined by curved top wall 241 of the cover 209 allows the clutch assembly 201 having lever assemblies 205 to fit within the confines of a bellhousing (not shown) that encloses the assembly and isolates it from the driver of a vehicle. Due to space limitations of the bellhousing, covers having a top wall with a flat external surface or an external surface defined by a curve having a constant radius of curvature are not conducive to the use of centrifugal lever assemblies.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A friction clutch assembly for connecting driving and driven shafts, comprising:
   a cover adapted for mounting on a flywheel of said driving shaft in a fixed axial position relative to the flywheel and for conjoint rotation with the flywheel,
   a pressure plate supported by the cover for rotation therewith, the pressure plate having a contact surface for receiving a driving force from the driving shaft, the pressure plate being axially moveable between an engaged position wherein the pressure plate applies a force to clamp a friction disk of said driven shaft in operative engagement with the flywheel thereby to transmit torque from the driving shaft to the driven shaft and a disengaged position wherein the pressure plate does not clamp said friction disk and substantially no torque is transmitted to the driven shaft,
   a spring supported by the cover to urge the pressure plate into the engaged position, compression of said spring releasing pressure on said pressure plate to permit movement of said pressure plate to the disengaged position,
   at least one spacer adapted to be attached to the cover and the flywheel for conjoint rotation therewith, the spacer being slidably received by the pressure plate to connect the pressure plate to the cover and permit axial movement of the pressure plate between the engaged position and the disengaged position, the spacer having an external surface that engages the pressure plate upon rotation of the flywheel,
   the spacer being rotatably moveable with the cover and the flywheel, and the external surface of the spacer conforming to the contact surface of the pressure plate so that torque is transmitted between the flywheel and the pressure plate over at least a line of engagement of the spacer external surface and the pressure plate contact surface upon rotation of the flywheel, wherein the external surface of said spacer has at least three contact surfaces, the spacer being adapted for being nondestructively and releasably connected to the flywheel in a position presenting one of its contact surfaces for engaging the contact surface of the pressure plate and after said one contact surface of the spacer becomes worn, nondestructively and releasably attached to the flywheel in another position presenting a different one of its contact surfaces for engaging the contact surface of the pressure plate.

2. The friction clutch assembly set forth in claim 1 wherein the pressure plate comprises at least two contact surfaces, one for each of two of the at least three contact surfaces of the spacer.

3. The friction clutch assembly set forth in claim 2 wherein said pressure plate has a notch including the contact surfaces of the pressure plate, and wherein said spacer is received in the notch.

4. The friction clutch assembly set forth in 3 wherein the contact surfaces of the spacer and the contact surfaces of the pressure plate are adapted for conformal engagement along respective aligned portions of the contact surfaces.

5. The friction clutch assembly set forth in claim 4 wherein said engagement of respective contact surfaces occurs over substantially the entire aligned portion of the contact surfaces.

6. The friction clutch assembly set forth in claim 3 wherein a first of the contact surfaces of the spacer engages a first of the contact surfaces of the notch upon acceleration of the flywheel in one direction and a second of the contact surfaces of the spacer engages a second of the contact surfaces of the notch upon deceleration of the flywheel.

7. The friction clutch assembly set forth in claim 4 wherein said conformal contact surfaces of the notch and the spacer are planar.

8. The friction clutch assembly set forth in claim 7 wherein said conformal contact surfaces of the notch and spacer are parallel upon engagement of the contact surfaces.

9. The friction clutch assembly set forth in claim 7 wherein said notch is a V-shaped notch.

10. The friction clutch assembly set forth in claim 3 further comprising an intermediate pressure plate, wherein said intermediate pressure plate has an external surface adapted for contact with said spacer.

11. The friction clutch assembly set forth in claim 10 wherein said intermediate plate has a notch with a first and second contact surface that are shaped to conform with the contact surfaces of the pressure plate.

12. The friction clutch assembly set forth in claim 1 wherein the contact surfaces are planar.

13. The friction clutch assembly set forth in claim 1 wherein at least one of said at least three contact surfaces of the spacer is not disposed for engaging the pressure plate in each index position of the spacer.

14. The friction clutch assembly set forth in claim 1 wherein the spacer is adapted to rotate about a longitudinal axis of the spacer to each of the indexed positions.

15. A friction clutch assembly for connecting driving and driven shafts, comprising:

a cover adapted for mounting on a flywheel of said driving shaft in a fixed axial position relative to the flywheel and for conjoint rotation with the flywheel, a pressure plate supported by the cover for rotation therewith, the pressure plate having a contact surface for receiving a driving force from the driving shaft, the pressure plate being axially moveable between an engaged position wherein the pressure plate applies a force to clamp a friction disk of said driven shaft in operative engagement with the flywheel thereby to transmit torque from the driving shaft to the driven shaft and a disengaged position wherein the pressure plate does not clamp said friction disk and substantially no torque is transmitted to the driven shaft, a spring supported by the cover to urge the pressure plate into the engaged position, compression of said spring releasing pressure on said pressure plate to permit movement of said pressure plate to the disengaged position, at least one spacer fixedly attached to the cover and the flywheel for conjoint rotation therewith, the spacer being slidably received by the pressure plate to connect the pressure plate to the cover and permit axial movement of the pressure plate between the engaged position and the disengaged position, the spacer having an external surface that engages the pressure plate upon rotation of the flywheel, the spacer being rotatably moveable with the cover and the flywheel, and the external surface of the spacer conforming to the contact surface of the pressure plate so that torque is transmitted between the flywheel and the pressure plate over at least a line of engagement of the spacer external surface and the pressure plate contact surface upon rotation of the flywheel, wherein the external surface of said spacer has at least three contact surfaces, the spacer being adapted for being nondestructively indexed to different positions for selectively presenting any one of its contact surfaces for engaging the contact surface of the pressure plate;

wherein the cover defines a recess and the spacer is received in the recess, the recess including a side for each contact surface of the spacer, each side being engageable with a corresponding contact surface to hold the spacer against rotation relative to the cover about a longitudinal axis of the spacer.

16. A friction clutch assembly for connecting driving and driven shafts, comprising:

a cover adapted for mounting on a flywheel of said driving shaft in a fixed axial position relative to the flywheel and for conjoint rotation with the flywheel, a pressure plate supported by the cover for rotation therewith, the pressure plate having a contact surface for receiving a driving force from the driving shaft, the pressure plate being axially moveable between an engaged position wherein the pressure plate applies a force to clamp a friction disk of said driven shaft in operative engagement with the flywheel thereby to transmit torque from the driving shaft to the driven shaft and a disengaged position wherein the pressure plate does not clamp said friction disk and substantially no torque is transmitted to the driven shaft, a spring supported by the cover to urge the pressure plate into the engaged position, compression of said spring releasing pressure on said pressure plate to permit movement of said pressure plate to the disengaged position, at least one spacer fixedly attached to the cover and the flywheel for conjoint rotation therewith, the spacer being slidably received by the pressure plate to connect the pressure plate to the cover and permit axial movement of the pressure plate between the engaged position and the disengaged position, the spacer having an external surface that engages the pressure plate upon rotation of the flywheel, the spacer being rotatably moveable with the cover and the flywheel, and the external surface of the spacer conforming to the contact surface of the pressure plate so that torque is transmitted between the flywheel and the pressure plate over at least a line of engagement of the spacer external surface and the pressure plate contact surface upon rotation of the flywheel, wherein a V-shaped notch is formed in the pressure plate, the V-shaped notch defining said contact surface for receiving a driving force from the driving shaft, said spacer being received in the V-shaped notch, and wherein the external surface of said spacer has multiple contact surfaces, the spacer being adapted for being indexed to different positions for selectively presenting any one of its contact surfaces for engaging the contact surface of the pressure plate.

17. The friction clutch assembly set forth in claim 16 wherein the external surface of the spacer includes at least two contact surfaces and the V-shaped notch defines at least two contact surfaces, one for each of two contact surfaces of the spacer.

18. The friction clutch assembly set forth in claim 17 wherein a first of the contact surfaces of the spacer engages a first of the contact surfaces of the V-shaped notch upon acceleration of the flywheel in one direction and a second of the contact surfaces of the spacer engages a second of the contact surfaces of the V-shaped notch upon deceleration of the flywheel.

19. The friction clutch assembly set forth in claim 18 wherein the contact surfaces of the spacer and the contact surfaces of the pressure plate are adapted for conformal engagement.

20. The friction clutch assembly set forth in claim 19 wherein said conformal engagement of respective contact surfaces occurs over substantially the entire aligned portion of the contact surfaces.

21. The friction clutch assembly set forth in claim 16 wherein at least one contact surface of the spacer is not disposed for engaging the pressure plate in each index position of the spacer.

22. The friction clutch assembly set forth in claim 16 wherein the spacer is adapted to rotate about a longitudinal axis of the spacer to each of the indexed positions.

23. The friction clutch assembly set forth in claim 16 wherein the cover defines a recess and the spacer is received in the recess, the recess including a side for each contact surface of the spacer, each side being engageable with a corresponding contact surface to hold the spacer against rotation relative to the cover about a longitudinal axis of the spacer.

* * * * *